Oct. 14, 1941.   R. G. RAYDEN   2,259,115
CONTROL SYSTEM
Filed Sept. 10, 1938
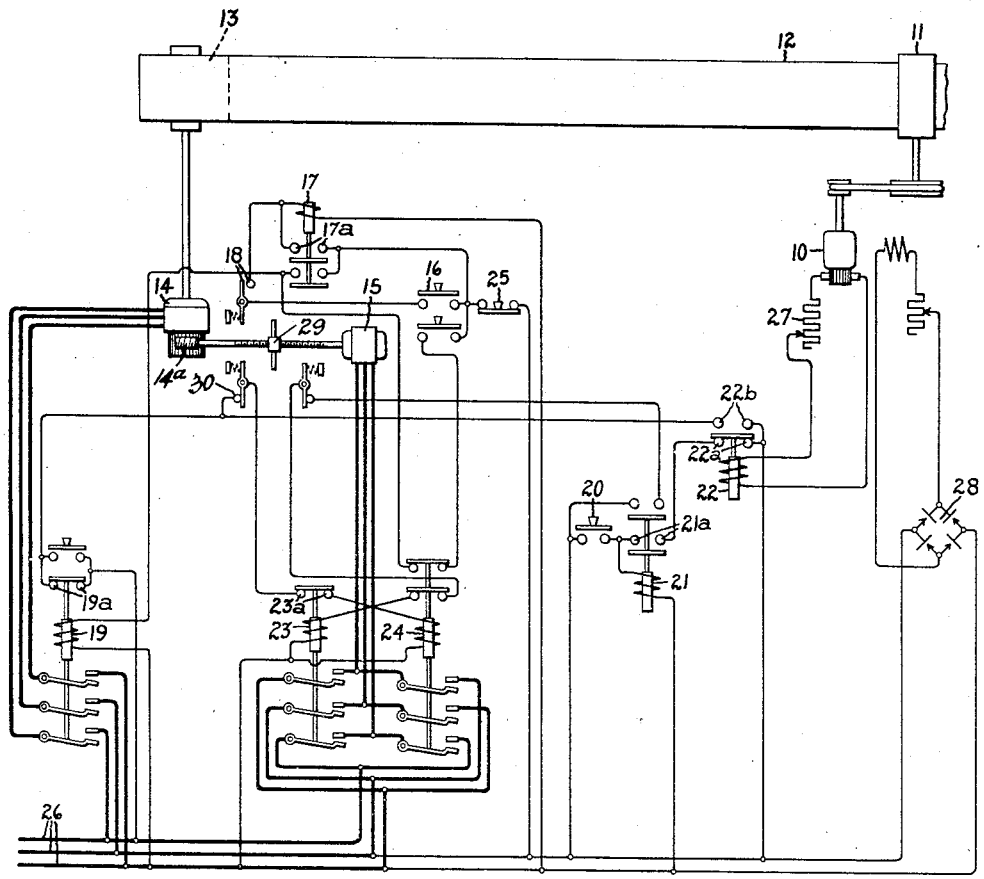
Inventor:
Raymond G. Rayden,
by Harry E. Dunham
His Attorney.

Patented Oct. 14, 1941

2,259,115

UNITED STATES PATENT OFFICE 2,259,115

CONTROL SYSTEM

Raymond G. Rayden, Rugby, England, assignor to General Electric Company, a corporation of New York Application September 10, 1938, Serial No. 229,321
In Great Britain December 2, 1937

5 Claims. (Cl. 242—75)

This invention relates to the control of electric motors and more particularly to the speed control of an electric motor driving a reel on which a length of material such as steel is being wound. An object of this invention is to provide means whereby the linear speed of the material being wound on the reel is kept approximately constant and also to provide means for presetting the linear speed of the material over a wide range.

Although the invention is applicable to any type of variable speed A.-C. or D.-C. motor, it will be described in connection with a variable speed A.-C. commutator motor with motor operated brush gear.

This invention consists in providing a tachometer-generator driven in accordance with the speed of the strip by any suitable means such, for example, as pinch rolls through which the material passes before being wound on the reel so that the voltage of the generator is proportional to the speed of the material. The armature of the generator is connected through an adjustable resistance to the contacts of a sensitive electroresponsive device and the resistance is set in accordance with the linear speed of the material at which it is desired that the electroresponsive device will respond to initiate a controlling action.

For a better and more complete understanding of the invention, reference should now be had to the following specification and to the accompanying drawing, the single figure of which is a simple, schematic diagram of an embodiment of the invention.

Referring now to the drawing, a pilot-generator 10 is shown as being connected to pinch rolls 11 between which a length of material 12 passes on its way to the reel 13 which is driven by a commutator motor 14 the brushes of which are shifted by means of a pilot motor 15 and brush shifting gear 14a driven thereby.

Depressing the start push button 16 will close pilot contactor 17 provided the brush gear of the commutator reel motor is in the "off" or low speed position and limit switch contacts 18 are closed. Contactor 17 in closing, seals itself through contacts 17a and completes the coil circuit of line contactor 19 which closes and starts up the reel motor at low speed. The "raise" speed button 20 is then depressed to energize and close contactor 21 which seals itself in through an interlock 21a and the bottom contacts 22a of relay 22. Contactor 21 in closing will complete the energizing circuit for the "raise" contactor 23 which will close and start the pilot motor 15 which operates the brush shifting gear of the reel motor, in a direction to increase the speed of the reel motor. When the linear speed of the material reaches the preset value, relay 22 will pick up and drop out contactor 21 which in turn drops out "raise" contactor 23.

As soon as contactor 23 drops out, an energizing circuit for "lower" contactor 24 is completed through interlock contacts 22b of relay 22 and interlock contacts 23a of "raise" contactor 23. Contactor 24 picks up and connects brush shifting pilot motor 15 to the source for rotation in a direction to lower the speed of the commutator motor. Relay 22 is preferably designed to drop out at a voltage approximately 2% to 5% less than its pick up voltage value so that when the linear speed of the material has dropped to this value, "lower" contactor 24 opens.

As the diameter of the coil of material builds up on the reel, the linear speed will increase until relay 22 picks up again and the operation described in the foregoing is repeated. In this way the speed of the reel motor is reduced in small steps and the linear speed of material remains approximately constant.

To stop the reel motor the "stop" button 25 is depressed to open its contacts. This will interrupt the coil circuit of line contactor 19 which will open to disconnect reel motor 14 from the supply source 26, and close its normally closed interlock contacts 19a to pick up "lower" contactor 24 and automatically return the brushes to the "off" position ready for another start. When this "off" or low speed position is reached, limit means including a rider 29 and a switch 30 operate to de-energize the contactor 24 and thereby the pilot motor 15.

By means of the adjustable resistance 27 in the coil circuit of relay 22, the linear speed can be preset to any given value.

A speed indicating instrument may be connected across the armature of the tachometer-generator 10 to give an indication of the speed of the material.

With the arrangement described above, no hunting takes place as the speed is being continually reduced.

The tachometer-generator can of course be driven by any available means which is proportional to the linear speed of the material and the invention is not limited to the method described in the particular example we have taken.

The tachometer-generator may be a permanent magnet generator or it may have its field separately excited through a rectifier such as copper oxide rectifier 28 or other means.

What I claim as new and desire to secure by Letters Patent of the United States is:

1. The combination with a take-up reel for a strip of material, an alternating current brush shifting driving motor therefor, a brush shifting mechanism for said motor, a pilot motor for actuating said brush shifting mechanism, a pilot generator driven by movement of said material for generating a voltage proportional to the speed of said material whereby variations in the speed of said material produce corresponding voltage variations, electroresponsive means responsive to said voltage variations for energizing said pilot motor to actuate said brush shifting mechanism only to decrease the speed of said brush shifting motor and thereby maintain the speed of said material substantially constant at a predetermined value, switching means for deenergizing said brush shifting motor, and means operated by said switching means when said brush shifting motor is deenergized for energizing said pilot motor independently of said electro-responsive device to drive said brush shifting mechanism back to a predetermined low speed setting.

2. The combination with a take-up reel for a strip of material, a drive motor therefor, control means for controlling the speed of the motor in response to the speed of the material, a control element having a low speed position for effecting low speed operation of the motor and having a plurality of higher speed positions for higher speed operation of the motor, said control means varying the position of said control element only to reduce the speed of said motor thereby to maintain the speed of the material substantially constant, means for stopping the motor, and means operated by said stopping means for returning said control element to said low speed position.

3. The combination with a take-up reel for a strip of material, a drive motor therefor, control means for controlling the speed of the motor in response to the speed of the material, a control element having a low speed position for effecting low speed operation of the motor and having a plurality of higher speed positions for higher speed operation of the motor, means for starting the motor only when said control element is in said low speed position, said control means varying the position of said control element only to reduce the speed of said motor thereby to maintain the speed of the material substantially constant, means for stopping the motor, and means operated by said stopping means for returning said control element to said low speed position.

4. The combination with a take-up reel for a strip of material, a drive motor therefor, a pilot generator driven at a speed proportional to the speed of the material, control means for said motor including an electro-responsive device responsive to the voltage of said generator, a pilot motor operated by said electro-responsive device and a control element driven by said pilot motor to a plurality of speed positions, said control means being arranged only to decrease the speed of the motor and thereby maintain the speed of the material substantially constant, means for starting the motor only when said control element is in a low speed position, means for stopping the motor, and means including a switch operated by said stopping means for energizing said pilot motor to drive said control element back to said low speed position.

5. The combination with a take-up reel for a strip of material, a drive motor therefor, a pilot generator driven at a speed proportional to the speed of the material, control means for said motor including an electro-responsive device responsive to the voltage of said generator, a pilot motor operated by said electro-responsive device and a control element driven by said pilot motor to a plurality of speed positions, said control means being arranged only to decrease the speed of the motor and thereby maintain the speed of the material substantially constant, means for starting the motor only when said control element is in a low speed position, means for stopping the motor, means including a switch operated by said stopping means for energizing said pilot motor to drive said control element back to said low speed position, and limit means operable by said control element for de-energizing said pilot motor when said low speed position is reached.

RAYMOND G. RAYDEN.